June 4, 1957 J. A. DONATO 2,794,962

TUBE-SOCKET, ESPECIALLY FOR PRINTED CIRCUITS

Filed April 21, 1954 2 Sheets-Sheet 1

INVENTOR.
JOHN A. DONATO
BY
James and Franklin
ATTORNEYS.

June 4, 1957 J. A. DONATO 2,794,962

TUBE-SOCKET, ESPECIALLY FOR PRINTED CIRCUITS

Filed April 21, 1954 2 Sheets-Sheet 2

INVENTOR.
JOHN A. DONATO
BY James and Franklin
ATTORNEYS.

United States Patent Office 2,794,962

Patented June 4, 1957

2,794,962

TUBE-SOCKET, ESPECIALLY FOR PRINTED CIRCUITS

John A. Donato, Brooklyn, N. Y., assignor to Industrial Hardware Mfg. Co., Inc., New York, N. Y., a corporation of New York Application April 21, 1954, Serial No. 424,713

8 Claims. (Cl. 339—128)

This invention relates to sockets for radio and like tubes, and more particularly to a socket intended for use with printed circuits.

In printed circuitry the chassis is made of insulation instead of metal, and the circuit wiring consists of narrow strips of a metallic paint or ink printed directly on the chassis. An ordinary tube socket has soldering lugs intended for use with wires, and is therefore not well suited for use with printed circuitry. It has accordingly been suggested that the insulation chassis be perforated with circles of small slots to receive the metal contact elements of a tube socket, but this has not proved satisfactory. It places on the set manufacturer the burden of providing a very intricately punched chassis, requiring dies having a vast number of tiny punches, and requiring great precision in dimension and location. The socket manufacturer is a specialist who has learned over many years how to overcome these difficulties, and the set manufacturer prefers to purchase a completely assembled, workable socket from a socket manufacturer.

One primary object of the present invention is to overcome the foregoing difficulties, and to provide an improved tube socket for use with printed circuits. A more specific object is to provide a tube socket requiring only a single large hole in the chassis to receive the same. Still another object is to provide a tube socket which may be snapped into position in the chassis without requiring rivets, eyelets, screws, or other such fastening means.

A still further object of the invention is to so design the tube socket as to provide contact lugs which will bear resiliently against the printed conductors, thus providing electrical contact even without solder. Solder may be employed, and most manufacturers will prefer to do so, but the soldering operation is facilitated because the parts to be soldered are in proper position in firm contact with one another.

Still another object of the invention is to fulfill and satisfy the foregoing objects by means of a socket of the so-called "laminated" or "wafer" type which is inexpensive to manufacture compared to sockets of the so-called "molded" type.

To accomplish the foregoing general objects, and other more specific objects which will hereinafter appear, my invention resides in the socket elements, and their relation one to another, as are hereinafter more particularly described in the following specification. The specification is accompanied by drawings, in which.

Figure 1:
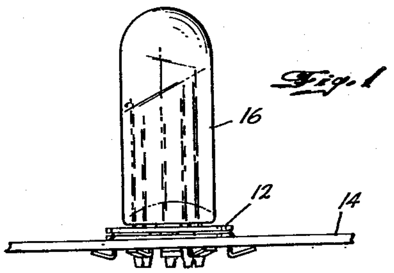
Fig. 1 is a front elevation of a tube socket embodying features of the present invention, mounted on a chassis, and carrying a tube.
Figure 10:
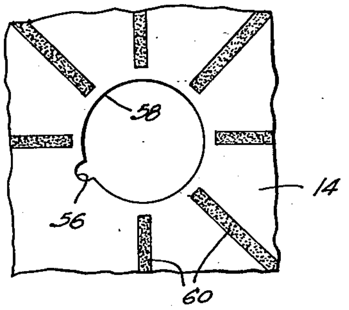
Fig. 10 is a fragmentary bottom plan view of the chassis showing how the conductors are printed in radial position immediately outside the socket hole.

Referring to the drawing, and more particularly to Fig. 1, the socket 12 is mounted in a large hole in a chassis plate 14. The latter is made of insulation and carries a printed circuit, preferably printed on the bottom of plate 14. This is shown in Fig. 10. The socket shown in Fig. 1 is for a miniature tube 16, the said tube having a ring of pins, there usually being seven pins disposed at the spacing for eight pins, the gap for the missing pin serving to properly orient the tube in the socket.

Figure 2:
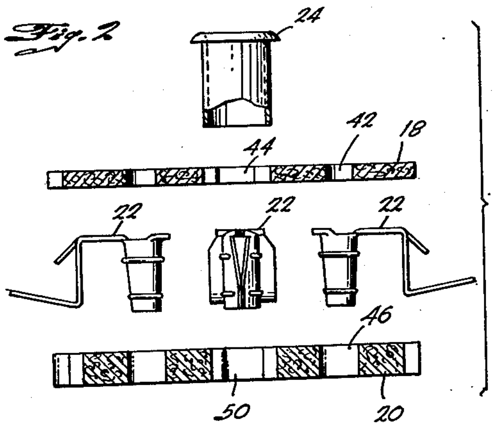
Fig. 2 is an exploded view, partially in section, showing the parts of the socket.
Figure 3:
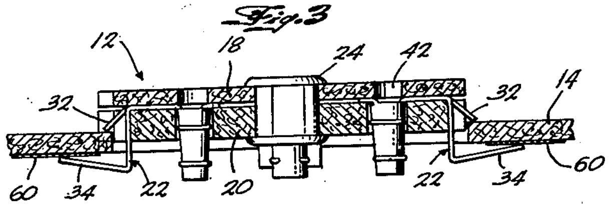
Fig. 3 is a transverse section through the socket after it has been assembled and inserted in a chassis.

The socket is of the laminated or wafer type in which the insulation is stamped out of sheet insulation, usually a phenolic such as "Bakelite." Referring to Figs. 2 and 3 it will be seen that wafers 18 and 20 of insulation are secured together with metal contacts 22 therebetween, the wafers being held together by a center eyelet 24. It will be understood that there are seven contacts disposed on a circle, to matingly receive the seven pins of the tube.

Figure 5:
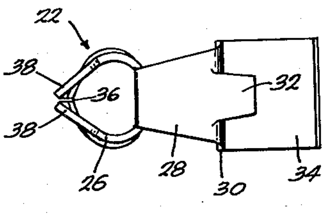
Fig. 5 is a plan view of a metal contact forming a part of the socket.
Figure 6:
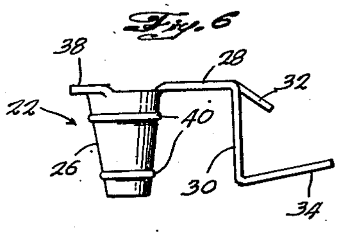
Fig. 6 is a side elevation of the same.
Figure 7:
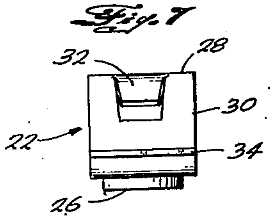
Fig. 7 is an end elevation of the same looking toward the left as viewed in Fig. 6.

One of the contacts is shown drawn to enlarged scale in Figs. 5, 6 and 7 of the drawing. Referring to those figures, the contact comprises a pin grip portion 26, a bridge portion 28 extending outwardly therefrom, and a contact lug portion 30 bent downwardly from the bridge portion 28. The contact lug portion has a tab 32 struck outwardly therefrom, preferably immediately beneath the bridge portion 28, and the end 34 of the contact lug portion is bent outwardly and slopes upwardly. It will be understood that the spacing between the free ends of the tab 32 and the lug 34 is such as to receive the printed chassis therebetween with a resilient fit.

In the present case the pin grip portion 26 is of the split sleeve type, that is, it is a somewhat frustro-conical or convergent member longitudinally split as shown at 36 in Fig. 5. It is thus dimensioned to receive the tube pin with a resilient grip. The upper ends of the free edges are preferably projected sidewardly to provide support nibs 38 which are adapted to be received between the wafers, and which help support the pin grip sleeves against the downward force of a tube being inserted in the socket. The barrel of the sleeve 26 may be reinforced and stiffened by means of channels or grooves 40.

The tab 32 preferably slopes downwardly as shown in order to facilitate insertion of the finished socket in its mating socket hole. The contact lug 34 preferably slopes upwardly at an angle of, say, ten degrees. This insures improved contact of each of the contact lugs with its printed conductor on the chassis.

Figure 8:
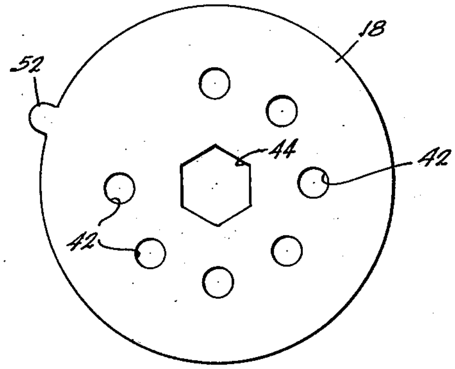
Fig. 8 is a plan view of the upper wafer of the socket.

Referring now to Fig. 8 of the drawing, the upper wafer 18 has a ring of holes 42 suitably spaced and dimensioned to receive the tube pins. There is also a center hole 44 which is preferably non-circular, in this case hexagonal.

Figures 9, 11, 12:
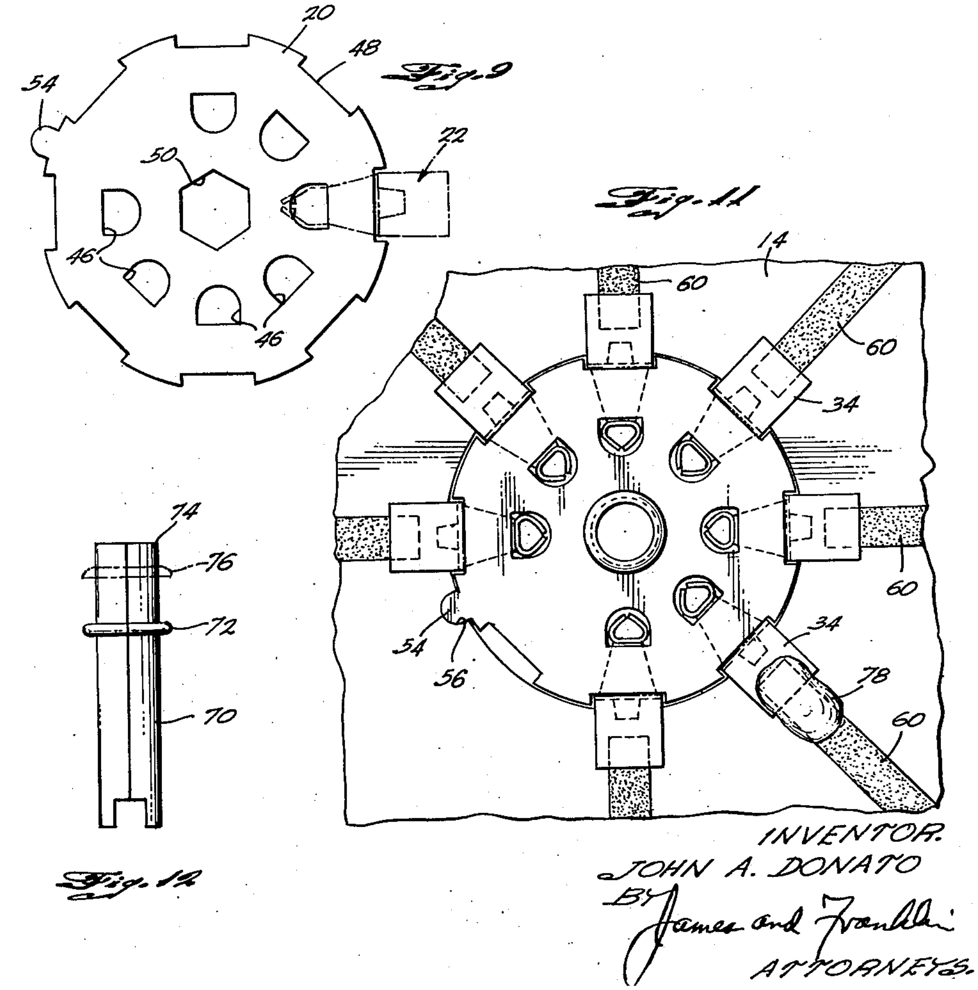
Fig. 9 is a plan view of the lower wafer of the socket.
Fig. 11 is a fragmentary bottom plan view drawn to larger scale, with the socket in position, and showing how the contact lugs of the socket engage the conductors of the printed circuit.
Fig. 12 shows a center shield which may be used at the center of the socket and which, when used, acts also as the center eyelet of the socket.

The lower wafer 20 is shown in Fig. 9. This wafer has a ring of holes 46 suitably dimensioned to receive the pin grip portions of the contacts. They are preferably received loosely in order to permit some lateral movement or self-adjustment of the contacts when the tube is inserted. The lower wafer 20 also has a ring of inward notches 48, one for each hole 46. These notches are dimensioned to receive the downwardly bent contact lug portions 30 (Figs. 5–7) of the metal contacts. The position of one of these contacts is indicated in broken lines at 22 in Fig. 9. Wafer 20 also has a center hole 50 which preferably matches the hole 44 in Fig. 8, so that in the present case both holes are hexagonal and properly oriented to insure registration of the pin holes 42 with the pin grip portions 46.

In Figs. 8 and 9 it will be seen that the wafers are provided with locating means 52 and 54 for cooperating with a mating means 56 (Fig. 10) at the socket hole 58 of the chassis in order to fix the orientation of the socket, and thereby to insure registration of the contact lugs with the printed circuitry. Thus, referring to Fig. 11, because of the key 54 and notch 56, the contact lugs 34 are brought in registration with the printed lines 60, and the tube electrodes are properly connected through their tube pins to the correct circuit conductors.

Figure 4:
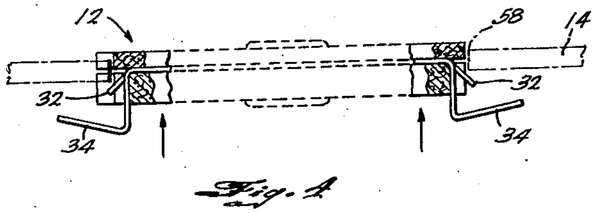
Fig. 4 is a partially sectioned view similar to Fig. 3, but showing the socket as it is being inserted through a hole in the chassis.

One of the features of the present invention is that the socket may be assembled with the chassis by simply pushing it into position. Referring to Fig. 4, the socket is pushed upwardly from beneath. It readily passes through the socket hole 58 until the tabs 32 reach the chassis 14. The socket may then be pushed home more forcibly, during which the tabs 32 are bent downwardly and inwardly to afford passage through the socket hole. When the socket has been pushed upward far enough the tabs 32 spring outward above the chassis, as shown in Fig. 3. At this time the contact lugs 34 have been bent downwardly and are under tension, so that the chassis 14 is resiliently gripped between the tabs 32 on top, and the contact lugs 34 on bottom. Inasmuch as there is a ring of tabs and a ring of contact lugs, the socket is firmly and securely held in position without requiring any of the usual external fastening means. The grip of the socket on the chassis is sufficient to withstand the insertion or removal of a tube.

The socket is completely assembled by the socket manufacturer, and its mode of assembly is substantially the same as when assembling an ordinary laminated tube socket. Thus referring to Fig. 2, the metal contacts 22 are dropped into position in the lower wafer 20. The upper wafer 18 is then applied, and the wafers are secured together by means of the eyelet 24. This may start as a round eyelet, but after expansion it ends up as a somewhat hexagonally shaped eyelet, which helps maintain the top and bottom wafers in proper registration. Such registration is important in order to keep the pin holes 42 above the pin grip portions 46, and in order to keep the locating projection or key 52 (Fig. 8) directly over the key 54 (Fig. 9). The eyelet is expanded or riveted in a suitable press or die.

As will be understood by those skilled in the art, the socket is sometimes provided with a so-called "center shield." This is a cylinder of metal projecting downwardly well below the pin grip portions of the contacts. The shield preferably acts also as the center eyelet of the socket, and the construction will be understood on reference to Fig. 12 of the drawing, in which it will be seen that shield 70 is expanded at 72 to act as the bottom of the eyelet. The upper end 74 is passed through the laminations and is then spread or riveted downwardly and outwardly, as shown at 76. Here again the shield, or rather the upper eyelet portion thereof, becomes somewhat hexagonal during the riveting operation, and so mates with the center holes of the wafers.

It will be understood that various other designs of pin grip portion have been evolved, and that the split sleeve here shown, although considered preferable and desirable, is only one of a number of forms of pin grip portion which may be used.

If the set manufacturer prefers to solder the connections between the socket and the printed circuit the solder may be applied directly over the contact lug 34 and the printed conductor, as is indicated at 78 in Fig. 11.

It will be understood that while I have described the printed circuit as being printed on the bottom of the chassis, one advantage of the present socket is that the printed circuit may instead be printed on top of the chassis, for in such case contact with the printed conductor is made by the downwardly sloping tab 32 instead of by the upwardly sloping lug 34. Moreover, a circuit may be printed partially on bottom and partially on top of the chassis, and some conductors may reach the socket on bottom while other conductors may reach the socket on top of the chassis. Either the top or the bottom conductors will be engaged by the contact lug, including as it does both the tab 32 and the lug 34. In certain cases a printed conductor on top and a printed conductor on bottom of the chassis may both reach the same contact as when these conductors are to be joined at the contact. A top tab 32 may be soldered to its top conductor much as a bottom lug 34 may be soldered to its bottom conductor.

It is believed that the construction, method of assembly, and method of use of my improved socket, as well as the many advantages thereof, will be apparent from the foregoing detailed description. It will also be apparent that while I have shown and described my invention in a preferred form, changes may be made without departing from the scope of the invention, as sought to be defined in the following claims.

I claim:

1. A metal contact for use in a laminated tube socket for use with a chassis having printed wiring, said metal contact comprising a pin grip portion, a bridge portion extending outwardly therefrom, and a contact lug portion bent downwardly from said bridge portion, said contact lug portion having a tab struck outwardly therefrom beneath the bridge portion, the end of said contact lug being bent outwardly and sloping upwardly, the spacing between said tab and lug being such as to receive the printed chassis therebetween with a resilient fit.

2. A metal contact for use in a laminated tube socket for use with a chassis having printed wiring, said metal contact comprising a split sleeve portion to grip a tube pin, a bridge portion extending outwardly therefrom, and a contact lug portion bent downwardly from said bridge portion, said contact lug portion having a tab struck outwardly therefrom and sloping downwardly immediately beneath the bridge portion, the end of said contact lug being bent outwardly and sloping upwardly, the spacing between said tab and lug being such as to receive the printed chassis therebetween with a resilient fit, the upper end of said sleeve portion having support nibs projecting inwardly therefrom, said bridge portion and nibs being adapted to be received between the wafers of a laminated tube socket.

3. A laminated tube socket for use with a chassis having printed wiring, said tube socket comprising a wafer having a ring of holes for the tube pins, a wafer having a ring of holes for the pin grip portions of metal contacts, each of said metal contacts comprising a pin grip portion, a bridge extending outwardly therefrom between said wafers, and a contact lug portion bent downwardly from said bridge portion, the rim of said latter wafer being inwardly notched to receive a bent contact lug portion, said contact lug portion having a tab struck outwardly therefrom, the end of said contact lug being bent outwardly, the spacing between said tab and lug being such as to receive the printed chassis therebetween with a resilient fit, the construction being such that the socket may be pushed through a large mating socket hole in the chassis, with the contact lugs on the side of the chassis having the printed wiring.

4. A laminated tube socket for use with a chassis having printed wiring on bottom, said tube socket comprising an upper wafer having a ring of holes for the tube pins, a lower wafer having a ring of holes for the pin grip portions of metal contacts, each of said metal contacts comprising a pin grip portion, a bridge portion extending outwardly therefrom between said wafers, and a contact lug portion bent downwardly from said bridge portion, the rim of said lower wafer being inwardly notched to receive a downwardly bent contact lug portion, said contact lug portion having a tab struck outwardly therefrom and sloping downwardly beneath the bridge portion, the end of said contact lug being bent outwardly and sloping upwardly, the spacing between said tab and lug being such as to receive the printed chassis therebetween with a resilient fit, the construction being such that the socket may be pushed upwardly through a large mating socket hole in the chassis, with the contact lugs on the lower side of the chassis having the printed wiring for contact therewith.

5. A laminated tube socket for use with a chassis having printed wiring on bottom, said tube socket comprising an upper wafer having a ring of holes for the tube pins, a lower wafer having a ring of holes for the pin grip portions of metal contacts, each of said metal contacts comprising a pin grip portion, a bridge portion extending outwardly therefrom between said wafers, and a contact lug portion bent downwardly from said bridge portion, the rim of said lower wafer being inwardly notched to receive a downwardly bent contact lug portion, said contact lug portion having a tab struck outwardly therefrom and sloping downwardly immediately beneath the bridge portion, the end of said contact lug being bent outwardly and sloping upwardly, the spacing between said tab and lug being such as to receive the printed chassis therebetween with a resilient fit, the construction being such that the socket may be pushed upwardly through a large mating socket hole in the chassis, with the contact lug on the lower side of the chassis having the printed wiring for contact therewith, said base having a locating means for cooperating with a mating means at the socket hole of the chassis for fixing the orientation of the socket in order to insure registration of the lugs with the printed circuit.

6. A laminated tube socket for use with a chassis having printed wiring on bottom, said tube socket comprising an upper wafer having a ring of holes for the tube pins, a lower wafer having a ring of holes for the sleeve portions of metal contacts, each of said metal contacts comprising a split sleeve portion to grip a tube pin, a bridge portion extending outwardly therefrom between said wafers, support nibs projecting inwardly therefrom between said wafers, and a contact lug portion bent downwardly from said bridge portion, the rim of said lower wafer being inwardly notched to receive a downwardly bent contact lug portion, said contact lug portion having a tab struck outwardly therefrom and sloping downwardly beneath the bridge portion, the end of said contact lug being bent outwardly and sloping upwardly, the spacing between said tab and lug being such as to receive the printed chassis therebetween with a resilient fit.

7. A tube socket for use with a chassis having a printed circuit, said tube socket comprising an insulation base carrying a ring of metal contacts to receive the pins of a tube, said contacts being spaced apart around the base and being thereby electrically insulated from one another, said contacts each comprising a pin grip portion, a bridge extending outwardly therefrom, and a strip of metal integral with said bridge, and extending generally in the direction of the axis of the tube, said strips of metal each having a tab and a lug which are spaced apart in the direction of the axis of the tube, said tab being excised from the body of the strip intermediate the edges of the strip, said tab being a socket supporting tab projecting outwardly from said strip and base, and said lug being a contact lug projecting outwardly from said strip and base, said tabs all sloping sharply toward the lugs and being adapted to yield inward when the socket is being pushed in a direction with the tabs leading the lugs through a large mating socket hole and to then spring outward after passing through the hole, and said lugs sloping toward the tabs with the parts so dimensioned as to receive the printed chassis between said tabs and lugs with a spring fit, with at least some of the lugs contacting the printed circuit on the bottom face of the printed chassis.

8. A tube socket for use with a chassis having a printed circuit on bottom, said tube socket comprising an insulation base carrying a ring of metal contacts to receive the pins of a tube, said contacts being spaced apart around the base and being thereby electrically insulated from one another, said contacts comprising a pin grip portion, a bridge extending outwardly therefrom, and a strip of metal integral with said bridge, and extending generally in the direction of the axis of the tube, said strips of metal each having a tab and a lug which are spaced apart in the direction of the axis of the tube, said tab being excised from the body of the strip intermediate the edges of the strip, said tab being a socket supporting tab projecting outwardly from said strip and base, and said lug being a contact lug projecting outwardly from said strip and base, said tabs all sloping sharply downwardly and being adapted to yield inward when the socket is being pushed upward in a direction with the tabs leading the lugs through a large mating socket hole and to then spring outward after passing through the hole, and said contact lugs sloping upwardly with the parts so dimensioned as to receive the printed chassis between said tabs and lugs with a spring fit, said lugs being adapted to contact the printed wiring on the bottom face of the chassis, said base having a plurality of holes for receiving the aforesaid pin grip portions and a plurality of locating means for receiving the aforesaid strips of metal in order to locate each of said contacts.

References Cited in the file of this patent

UNITED STATES PATENTS

| | | |
|---|---|---|
| 1,987,035 | Tideman | Jan. 8, 1935 |
| 2,229,585 | Osenberg | Jan. 21, 1941 |
| 2,581,967 | Mitchell | Jan. 8, 1952 |
| 2,595,188 | Del Camp | Apr. 29, 1952 |
| 2,742,627 | Lazzery | Apr. 17, 1956 |

FOREIGN PATENTS

| | | |
|---|---|---|
| 247,937 | Great Britain | Nov. 18, 1926 |
| 711,016 | Great Britain | June 23, 1954 |